(12) United States Patent  
Merryman (10) Patent No.: US 10,800,341 B2  
(45) Date of Patent: Oct. 13, 2020

(54) APPARATUS, SYSTEM, AND METHOD FOR PROVIDING A VEHICLE ACCESSORY

(71) Applicant: Donald Ray Merryman, La Quinta, CA (US)

(72) Inventor: Donald Ray Merryman, La Quinta, CA (US)

( * ) Notice: Subject to any disclaimer, the term of this patent is extended or adjusted under 35 U.S.C. 154(b) by 19 days.

(21) Appl. No.: 16/258,922

(22) Filed: Jan. 28, 2019

(65) Prior Publication Data

US 2020/0238920 A1    Jul. 30, 2020

(51) Int. Cl.
*B60R 9/06*    (2006.01)

(52) U.S. Cl.
CPC ............... *B60R 9/065* (2013.01); *B60R 9/06* (2013.01)

(58) Field of Classification Search
CPC .............. B60R 9/06; B60R 9/065; B66F 7/10
USPC ................ 224/495, 502, 509, 519, 524, 527
See application file for complete search history.

(56) References Cited

U.S. PATENT DOCUMENTS

| | | | | |
|---|---|---|---|---|
| 1,921,304 A * | 8/1933 | Stevenson | ............... | B60R 9/065 190/22 |
| 1,927,922 A * | 9/1933 | Crum | ...................... | B60R 9/065 296/37.2 |
| 4,593,840 A * | 6/1986 | Chown | ...................... | B60R 9/06 224/484 |
| 4,738,581 A * | 4/1988 | Kuhlman | ............. | A61G 3/0209 224/492 |
| 4,744,590 A * | 5/1988 | Chesney | ................... | B60R 9/06 224/520 |
| 4,775,282 A * | 10/1988 | Van Vliet | ............. | A61G 3/0209 224/519 |
| 5,439,151 A * | 8/1995 | Clayton | .................. | B60R 9/065 224/282 |
| 5,544,799 A * | 8/1996 | Didlake | .................... | B60R 9/06 224/282 |
| 5,845,832 A * | 12/1998 | Eichmann | ................. | B60R 9/06 224/509 |
| 5,884,826 A * | 3/1999 | Shaver | ...................... | B60R 9/06 211/195 |
| 6,105,843 A * | 8/2000 | Dollesin | ................. | B60R 9/065 224/495 |
| 6,123,498 A * | 9/2000 | Surkin | ...................... | B60R 9/06 224/509 |
| D440,429 S * | 4/2001 | Wales | ........................... | D6/671 |
| 6,260,752 B1 * | 7/2001 | Dollesin | ................. | B60R 9/065 224/495 |
| 6,575,155 B2 * | 6/2003 | Brennan | ............. | A47J 37/0763 126/276 |
| 6,725,855 B1 * | 4/2004 | Brennan | ............. | A47J 37/0763 126/276 |
| 6,802,441 B1 * | 10/2004 | DuRant | ................... | B60R 9/065 224/513 |
| 6,814,383 B2 * | 11/2004 | Reed, III | .............. | B60P 3/0257 224/404 |
| 7,188,856 B2 * | 3/2007 | Maynard | ................. | B60P 3/077 280/402 |

(Continued)

*Primary Examiner* — Justin M Larson (57) ABSTRACT

An apparatus is disclosed. The apparatus has a body assembly including at least one storage area, an adjustable assembly that is movably attached to the body assembly, the adjustable assembly including a plurality of members, and a jacking device disposed at least partially in the body assembly. The plurality of members are movably attached to each other. At least one of the plurality of members includes a vehicle-attachable portion.

13 Claims, 8 Drawing Sheets

(56) References Cited

U.S. PATENT DOCUMENTS

| | | | | |
|---|---|---|---|---|
| 7,249,771 B1* | 7/2007 | Brennan | A47J 37/0704 | 280/35 |
| 7,261,229 B1* | 8/2007 | Allen | B60R 9/06 | 224/495 |
| 7,419,347 B1* | 9/2008 | Cormier | B60P 1/548 | 212/180 |
| 7,527,282 B2* | 5/2009 | Gilbert | B60P 3/122 | 280/491.3 |
| 7,591,404 B2* | 9/2009 | LeDuc | B60R 9/06 | 126/276 |
| 7,641,235 B1* | 1/2010 | Anduss | B60R 9/06 | 224/509 |
| 7,726,719 B1* | 6/2010 | Barron | B60R 9/065 | 224/404 |
| 8,061,572 B2* | 11/2011 | Myrex | B60R 9/065 | 224/502 |
| 8,231,036 B2* | 7/2012 | Campbell | B60R 9/065 | 224/42.32 |
| 8,925,777 B1* | 1/2015 | Casucci | B60R 9/065 | 224/404 |
| 9,096,160 B2* | 8/2015 | Le Anna | B60R 9/06 | |
| 9,216,698 B2* | 12/2015 | Rhodes | B60R 9/065 | |
| 9,475,353 B2* | 10/2016 | Mehlen | B60R 9/065 | |
| 10,611,313 B2* | 4/2020 | Westcott | A47J 37/0704 | |
| 2004/0173654 A1* | 9/2004 | McAlister | B60D 1/52 | 224/519 |
| 2005/0133556 A1* | 6/2005 | Bolin | B60R 9/065 | 224/509 |
| 2006/0027618 A1* | 2/2006 | Williams | B60R 9/06 | 224/519 |
| 2006/0292915 A1* | 12/2006 | Bogoslofski | B60R 9/065 | 439/352 |
| 2012/0187658 A1* | 7/2012 | Wheeler | B60D 1/665 | 280/415.1 |
| 2012/0292357 A1* | 11/2012 | Tennyson | B60R 9/06 | 224/281 |
| 2015/0203049 A1* | 7/2015 | Eichmann | B60D 1/42 | 224/509 |
| 2017/0240088 A1* | 8/2017 | Tait | B60R 9/065 | |

* cited by examiner

APPARATUS, SYSTEM, AND METHOD FOR PROVIDING A VEHICLE ACCESSORY

TECHNICAL FIELD

The present disclosure is directed to an apparatus, system, and method for providing an accessory, and more particularly, to an apparatus, system, and method for providing a vehicle accessory.

BACKGROUND OF THE DISCLOSURE

Vehicle accessories are sometimes attached to vehicles to provide additional capacity for carrying items on a vehicle. Common vehicle accessories include luggage carriers and storage boxes such as tool or equipment boxes that may hold items to be transported and/or used by vehicle users.

Conventional vehicle accessories typically involve several disadvantages. Accessories such as cargo carriers and equipment storage boxes may be relatively heavy, making them difficult to attach to and detach from a vehicle. For example, users typically lift heavy accessories off of the ground and attempt to physically hold them in place in alignment with a vehicle attachment device to attach the accessory to the vehicle, which may be burdensome and physically demanding. Conventional accessories are also typically difficult to adjust, for example when the accessory is blocking a portion of the vehicle that a user wishes to access. Conventional accessories may also involve the physical efforts of several users simultaneously to attach or detach the accessories.

The exemplary disclosed apparatus, system, and method of the present disclosure is directed to overcoming one or more of the shortcomings set forth above and/or other deficiencies in existing technology.

SUMMARY OF THE DISCLOSURE

In one exemplary aspect, the present disclosure is directed to an apparatus. The apparatus includes a body assembly including at least one storage area, an adjustable assembly that is movably attached to the body assembly, the adjustable assembly including a plurality of members, and a jacking device disposed at least partially in the body assembly. The plurality of members are movably attached to each other. At least one of the plurality of members includes a vehicle-attachable portion.

In another aspect, the present disclosure is directed to a method. The method includes providing an assembly including a body assembly and an adjustable assembly having an adjustable attachment portion, storing material in the body assembly, selectively jacking the assembly configured in a first state up and down relative to a ground surface, selectively moving the assembly configured in a second state across the ground surface, and attaching the adjustable attachment portion to a vehicle attachment portion of a vehicle. A height of the adjustable attachment portion above the ground surface is based on selectively jacking the assembly. The height of the adjustable attachment portion above the ground surface is substantially equal to a height of the vehicle attachment portion above the ground surface.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

DETAILED DESCRIPTION AND INDUSTRIAL APPLICABILITY

Figure 1:
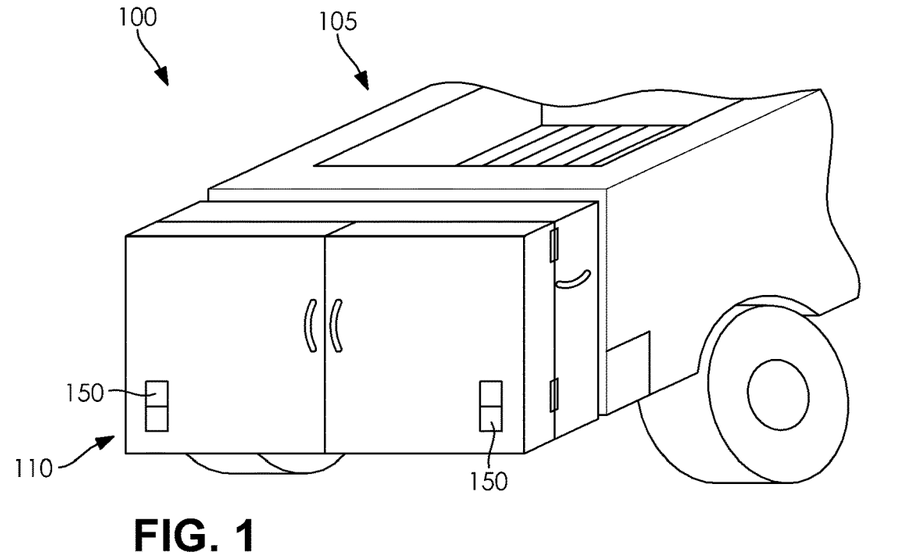
FIG. 1 is a perspective illustration of an exemplary system and apparatus, in accordance with at least some exemplary embodiments of the present disclosure.
Figure 2:
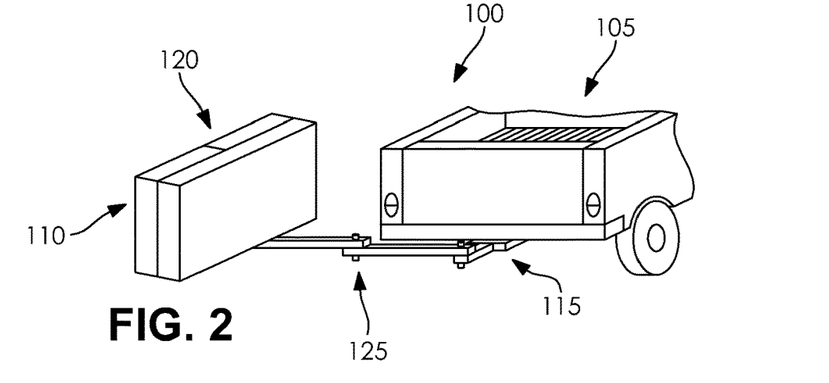
FIG. 2 is a perspective illustration of an exemplary system and apparatus, in accordance with at least some exemplary embodiments of the present disclosure.
Figure 3:
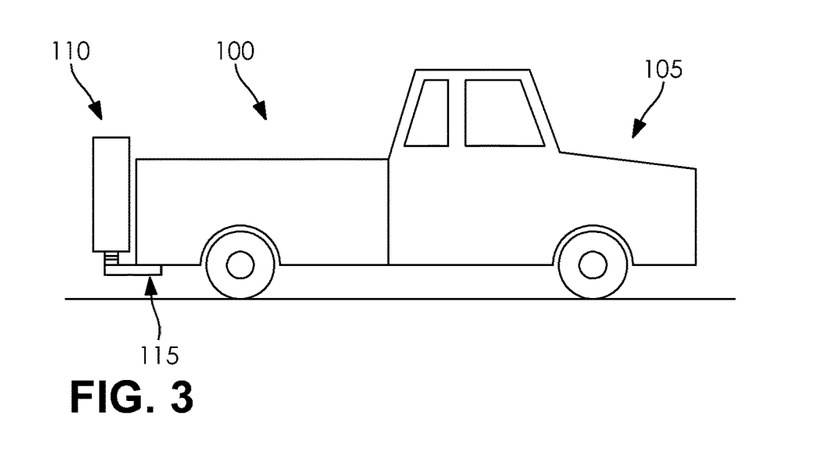
FIG. 3 is a side view of an exemplary system and apparatus, in accordance with at least some exemplary embodiments of the present disclosure.

The exemplary system, apparatus, and method may provide a vehicle accessory. For example, the exemplary system, apparatus, and method may provide any suitable accessory (e.g., as described below) for any suitable vehicle (e.g., as described below). FIGS. 1-3 illustrate an exemplary system 100 for providing a vehicle accessory. System 100 may include a vehicle 105, an assembly 110, and an attachment device 115. Assembly 110 may be attached to vehicle 105 via attachment device 115.

Vehicle 105 may be any suitable vehicle to which assembly 110 may be attached. Vehicle 105 may be a truck, a car, a waterborne vehicle such as a boat or a jet ski, an aircraft such as a fixed wing aircraft (e.g., airplane) or rotary wing aircraft (e.g., helicopter), a snowmobile, an unmanned vehicle such as a drone, and/or any other suitable vehicle.

Assembly 110 may be any suitable accessory that may be attached to vehicle 105. For example, assembly 110 may be a storage container, a luggage carrier, an equipment carrier, a tool box, a food container, a fluid liquid and/or fluid gas storage container, a motorcycle transporter (e.g., or transporter for any suitable vehicle such as a jet ski, all terrain vehicle, or other vehicle that may be carried on assembly 110 that may be a transport device), and/or any other suitable accessory for vehicle 105. Assembly 110 may itself be any suitable vehicle such as, for example, a motorcycle. Also for example, assembly 110 may be a recreational accessory such as a swim board or platform, a grill, a recreational equipment holder (e.g., ski holder), and/or any other suitable accessory used for recreational activities (e.g., ski sports, water sports, camping, and/or team sports).

Assembly 110 may be formed from any suitable materials for providing a vehicle accessory such as, for example, metallic, plastic, composite, and/or hybrid materials. For example, some or substantially all portions of assembly 110 may include steel, aluminum, carbon fiber, wood, and/or any other suitable structural material having suitable properties for use in a vehicle accessory. Also for example, some or substantially all portions of assembly 110 may include polymer material, structural metal (e.g., structural steel or structural aluminum, co-polymer material, thermoplastic and thermosetting polymers, resin-containing material, polyethylene, polystyrene, polypropylene, epoxy resins, phenolic resins, Acrylanitrile Butadiene Styrene (ABS), Polycarbonate (PC), Mix of ABS and PC, Acetal (POM), Acetate, Acrylic (PMMA), Liquid Crystal Polymer (LCP), Mylar, Polyamid-Nylon, Polyamid-Nylon 6, Polyamid-Nylon 11, Polybutylene Terephthalate (PBT), Polycarbonate (PC), Polyetherimide (PEI), Polyethylene (PE), Low Density PE (LDPE), High Density PE (HDPE), Ultra High Molecular Weight PE (UHMW PE), Polyethylene Terephthalate (PET), PolPolypropylene (PP), Polyphthalamide (PPA), Polyphenylenesulfide (PPS), Polystyrene (PS), High Impact Polystyrene (HIPS), Polysulfone (PSU), Polyurethane (PU), Polyvinyl Chloride (PVC), Chlorinated Polyvinyl chloride (CPVC), Polyvinylidenefluoride (PVDF), Styrene Acrylonitrile (SAN), Teflon TFE, Thermoplastic Elastomer (TPE), Thermoplastic Polyurethane (TPU), and/or Engineered Thermoplastic Polyurethane (ETPU), or any suitable combination thereof.

As illustrated in FIGS. 2 and 5-7, assembly 110 may include a body assembly 120 and an adjustable assembly 125. Adjustable assembly 125 may be movably attached to body assembly 120. For example, a user may move body assembly 120 relative to vehicle 105 based on a movement of adjustable assembly 125.

Figure 4:
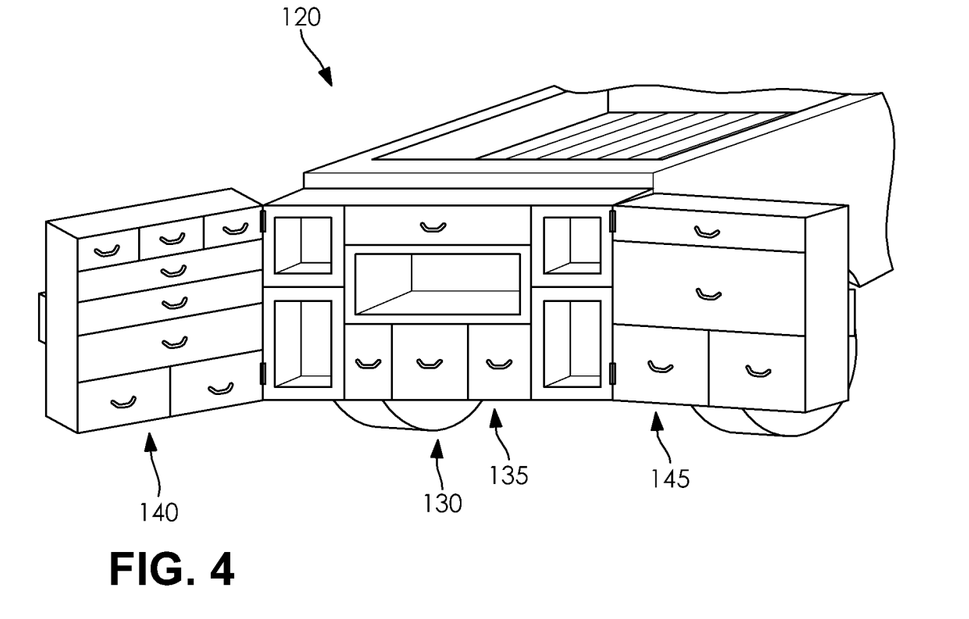
FIG. 4 is a perspective illustration of an exemplary system and apparatus, in accordance with at least some exemplary embodiments of the present disclosure.

As illustrated in FIG. 4, body assembly 120 may be any suitable assembly for holding objects and material. Body assembly 120 may include one or more storage areas 130. Storage areas 130 may be any suitable areas for storing objects or material such as, for example, recesses, cavities, drawers, cabinets, shelves, containers, and/or any other suitable areas for storing objects and/or materials. For example, body assembly 120 may include a plurality of pull-out drawers and areas for storing tools, equipment, materials (e.g., solid, liquid, or gaseous material in suitable containers), and/or any other desired objects. Storage area 130 may be accessed by a user using any suitable technique. In at least some exemplary embodiments, body assembly 120 may include a main body 135 and one or more movable bodies (e.g., movable bodies 140 and 145). For example, movable bodies 140 and 145 may be rotatably attached (e.g., via hinges and/or other suitable movable fasteners) to main body 135, and may be opened up by a user to access storage areas 130 of main body 135 and movable bodies 140 and 145. Movable bodies 140 and 145 may also be slidably movable relative to main body 135. It is contemplated that movable members 140 and 145 may move relative to main body 135 in any suitable manner. Storage areas 130 of body assembly 120 may also be accessed based on or more doors disposed on one or more sides, a top, and/or a bottom of body assembly 120.

Returning to FIG. 1, body assembly 120 may include one or more signal components 150. Signal component 150 may include electrical lighting and/or reflective components. For example, signal component 150 may include a vehicle running light, a brake light, a turn signal light, and/or a reflective panel. In at least some exemplary embodiments, one or more signal components 150 may serve as rear lighting of vehicle 105 when assembly 110 covers a rear side of vehicle 105. Signal component 150 may include electrical attachments (e.g., plugs) that may electrically connect lighting components of signal component 150 to an electrical system of vehicle 105.

Figure 8:
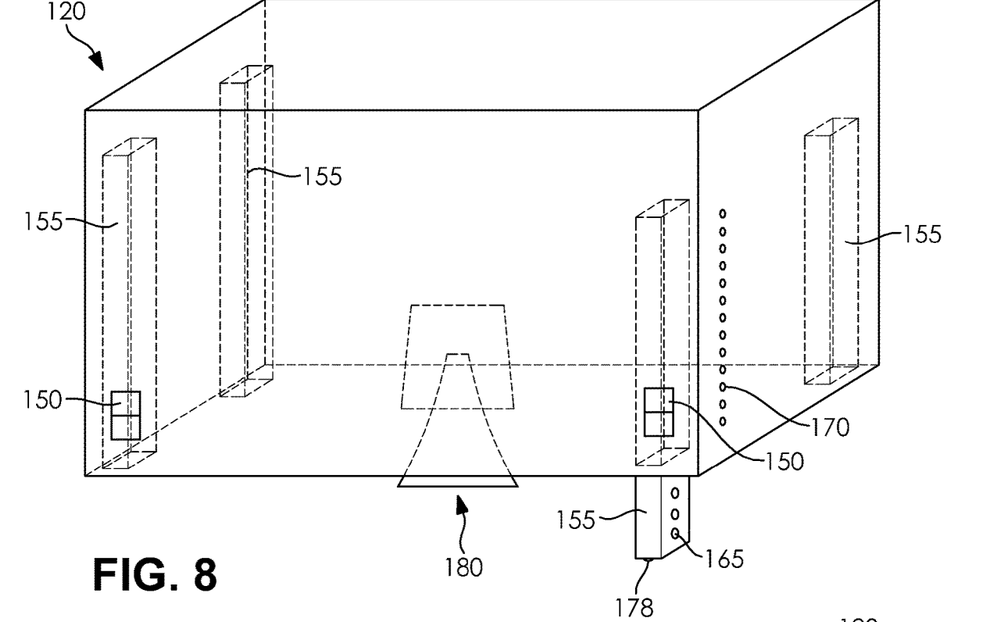
FIG. 8 is a perspective illustration of an exemplary system and apparatus, in accordance with at least some exemplary embodiments of the present disclosure.
Figure 9:
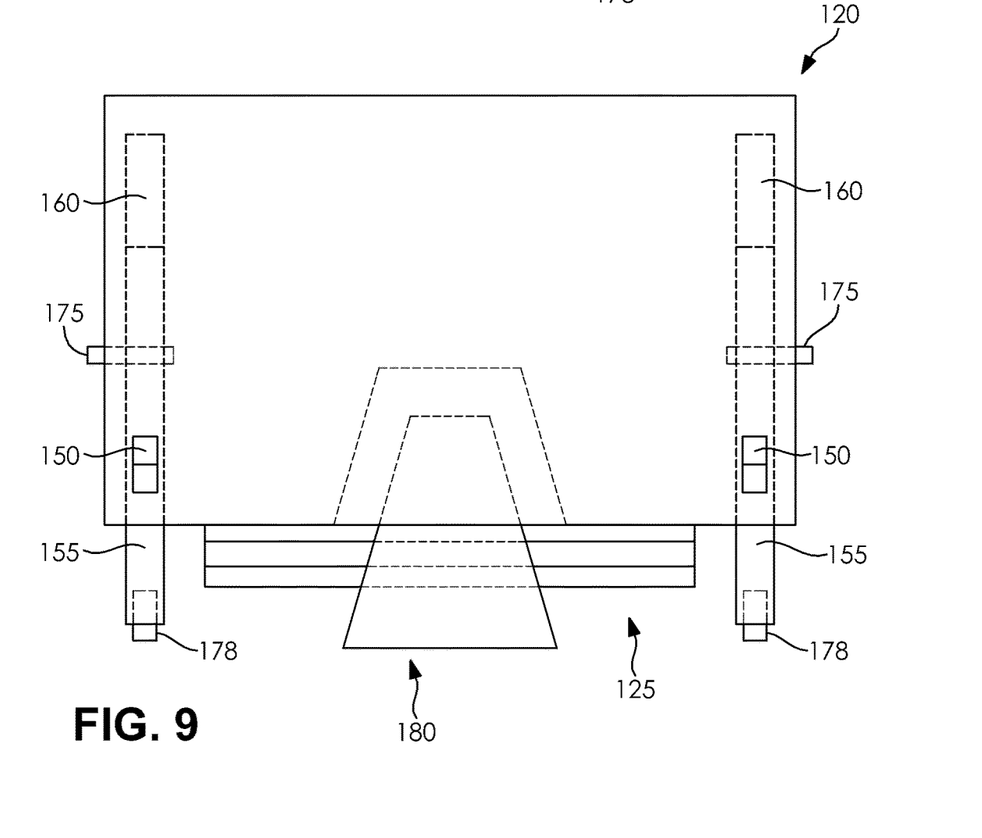
FIG. 9 is a side view of an exemplary system and apparatus, in accordance with at least some exemplary embodiments of the present disclosure.

As illustrated in FIGS. 8 and 9, body assembly 120 may include one or more movable members 155. Each movable member 155 may be received in a cavity or recess 160 (e.g., elongated cavity or elongated recess) that may be formed in body assembly 120 and may be configured to receive movable member 155. Each movable member 155 may be moved (e.g., slidably moved) within each respective cavity or recess 160. For example, body assembly 120 may include a plurality (e.g., three, four, or more) of each of movable members 155 and cavities or recesses 160. As illustrated in FIG. 8, each movable member 155 may include one or more apertures 165. Apertures 165 may be disposed along a length (e.g., partial length or a substantially entire length) of movable member 155. Corresponding apertures 170 may be disposed in an exterior surface of body assembly 120. Based on a position of movable member 155 within cavity or recess 160, some or all apertures 165 and 170 may be aligned. As illustrated in FIG. 9, a fastener 175 may be inserted through any aligned apertures 165 and 170 to lock movable member 155 in place in cavity or recess 160. Any desired number of fasteners 175 may be provided at each movable member 155 and cavity or recess 160. Fasteners 175 may be attached via a lanyard or other connecting member (e.g., flexible connecting member) to maintain an attachment of fastener 175 to body assembly 120 when fastener 175 is not in use. Fasteners 175 may lock a plurality of movable members 155 at any desired length of extension from a respective plurality of cavities or recesses 160 (e.g., as illustrated in FIG. 9). At an end portion of each movable member 155, an assembly 178 may be provided. Assembly 178 may be any suitable assembly for allowing a movement of body assembly 120 across a ground surface. For example, assemblies 178 may be wheel assemblies, caster assemblies, and/or any other suitable assembly for allowing body assembly 120 to move easily (e.g., with little or negligible friction force to be overcome) over a ground surface.

As illustrated in FIGS. 8 and 9, body assembly 120 may include one or more jacking devices 180. Jacking device 180 may be any suitable device for selectively raising or lowering body assembly 120 from a ground surface (e.g., road surface or surface of any suitable terrain). For example, jacking device 180 may be any suitable type of jack such as a hydraulic jack, pneumatic jack, and/or any other suitable type of mechanical jack. Jacking device 180 may be motorized, electrically powered, and/or manually driven. Jacking device 180 may for example be a scissor jack, a floor jack, a bottle jack, a Hi-lift® jack, a ratchet jack, and/or any other suitable type of jacking device. A portion of jacking device 180 may be disposed within body assembly 120. When operated, a portion of jacking device 180 may be extended out of body assembly 120 to lift body assembly 120 from a ground surface based on the extended portion of jacking device 180 exerting a force against the ground surface. Jacking device 180 may be operated by a user to raise or lower body assembly 120 to a desired height above a ground surface. Jacking device 180 may include user interface components (e.g., to receive user input), controller components, and/or manual driving components to allow a user to control jacking device 180 to move body assembly 180 to a desired height.

Movable members 155, cavities or recesses 160, and/or jacking device 180 may be disposed between, adjacent to, and/or partially or entirely within any storage areas 130. For example, storage areas 130 may be configured to accommodate locations of movable members 155, cavities or recesses 160, and/or one or more jacking devices 180.

Returning to FIGS. 5-7, adjustable assembly 125 may include one or more suitable structural members (e.g., members 185, 190, and 195). For example, adjustable assembly 125 may include a plurality of structural members similar to members 185, 190, and/or 195 (e.g., two, three, four, or more suitable structural members). Members 185, 190, and 195 may be elongated structural members. In at least some exemplary embodiments, members 185, 190, and/or 195 may be solid elongated structural members, hollow elongated structural members, and/or any other suitable structural members formed from the exemplary material described above. In at least some exemplary embodiments, adjustable assembly 125 may provide a swing arm feature.

Figure 5:
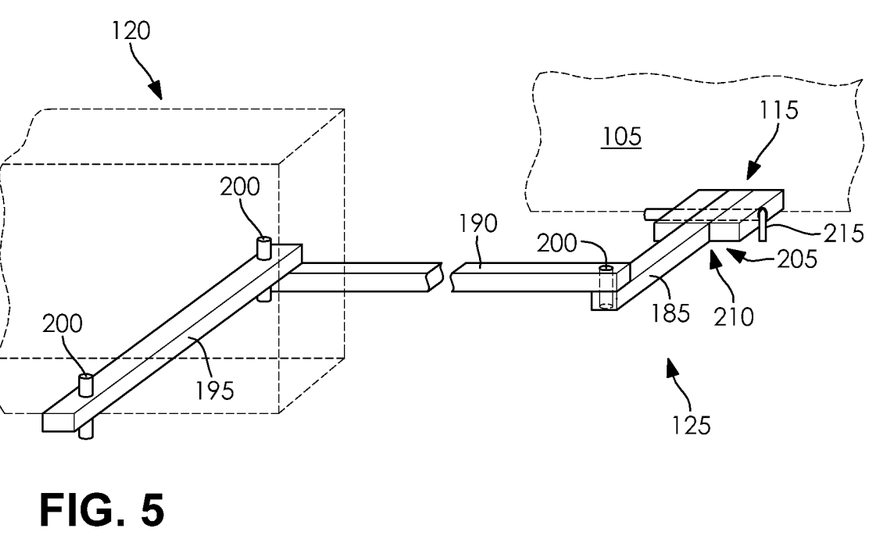
FIG. 5 is a perspective illustration of an exemplary system and apparatus, in accordance with at least some exemplary embodiments of the present disclosure.
Figure 6:
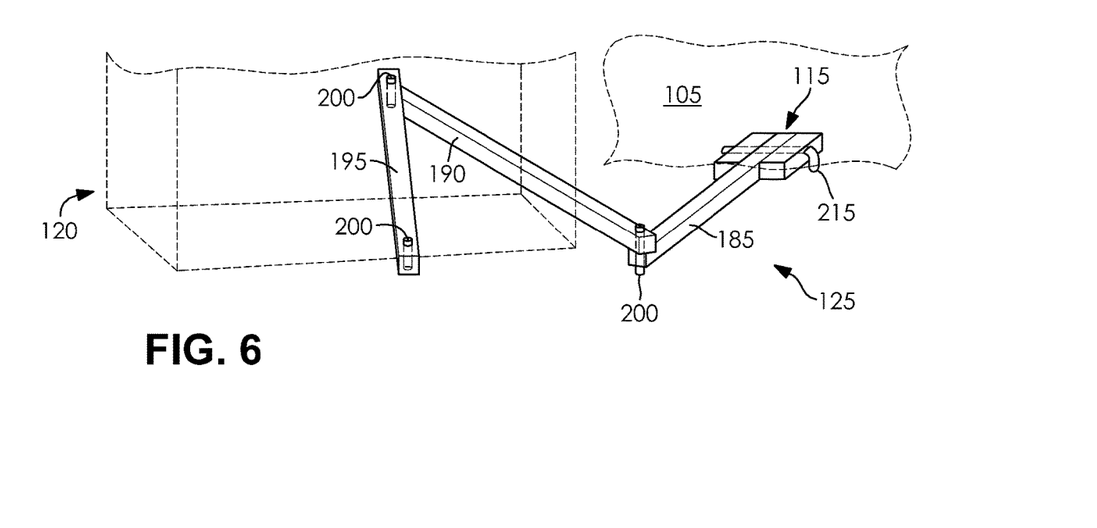
FIG. 6 is a perspective illustration of an exemplary system and apparatus, in accordance with at least some exemplary embodiments of the present disclosure.
Figure 7:
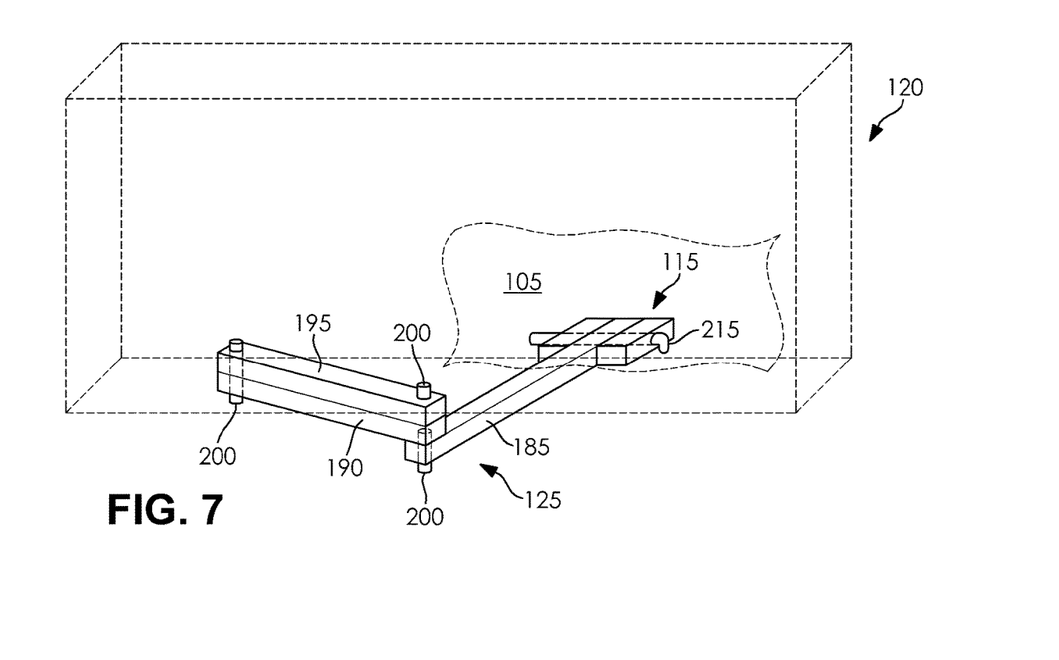
FIG. 7 is a perspective illustration of an exemplary system and apparatus, in accordance with at least some exemplary embodiments of the present disclosure.

Members 185, 190, and/or 195 may be movably attached to each other and to body assembly 120 by a plurality of fasteners 200. Fasteners 200 may be any suitable fasteners for movably attaching (e.g., rotatably attaching, slidably attaching, pivotably attaching, and/or attaching in any other suitable manner) members 185, 190, and 195 and/or body assembly 120. For example, fasteners 200 may allow members 185, 190, and 195 and/or body assembly 120 to rotate, pivot, translate, slide, and/or move in any other suitable manner relative to each other. Fasteners 200 may be locked in any desired position so that adjustable assembly 125 may be locked in any desired position. In at least some exemplary embodiments, fasteners 200 may include protrusions, cam portions, gears, recesses, and/or any other suitable features that may be configured to fit with corresponding protrusions, cam portions, gears, recesses, and/or any other suitable features of members 185, 190, and 195 and/or body assembly 120 to allow adjustable assembly 125 to be locked or held substantially stationary in any desired position. Fasteners 200 may for example allow any suitable number of discrete relative positions between adjacent components and/or may allow for continuous variation of positions through a rotational angle of at least 360 degrees between adjacent components. Fasteners 200 may be configured to allow movement between adjacent components based on any desired predetermined threshold of force for a user to apply to adjustable assembly 125 and/or body assembly 120. For example, a user may position adjustable assembly 125 in any desired position so that body assembly 120 is positioned in any desired location and orientation relative to vehicle 105. A user may then apply a force that is greater than or equal to a predetermined force threshold of fasteners 200 (e.g., to allow a movement of adjacent components connected via a given fastener 200) to allow movement of adjustable assembly 125 and body assembly 120 between stationary (e.g., locked or temporarily locked) positions.

As illustrated in FIGS. 5-7, attachment device 115 may be any suitable device for removably attaching adjustable assembly 125 to vehicle 105. Attachment device 115 may be removably attachable or fixedly attached (e.g., permanently attached) to any desired portion of vehicle 105. In at least some exemplary embodiments, attachment device 115 may be attached below a rear portion of vehicle 105. As illustrated in FIG. 5, attachment device 115 may include a cavity or recess 205 configured to receive a portion of adjustable assembly 125 (e.g., a portion 210 of member 185 or any other suitable portion of adjustable assembly 125). Attachment device 115 may include any suitable member or device for locking portion 210 in cavity or recess 205. In at least some exemplary embodiments, attachment device 115 may include a member 215 that may removably lock portion 210 in cavity or recess 205. In at least some exemplary embodiments, member 215 may be a fastener that may be removably inserted into apertures of portion 210 and attachment device 115 that may be aligned when portion 210 is placed in cavity or recess 205. For example, member 215 may be a pin, fastener, or any other suitable member that may be inserted through apertures of portion 210 and attachment device 115 to removably attach adjustable assembly 125 to attachment device 215.

In at least some exemplary embodiments, the exemplary disclosed apparatus may include a body assembly (e.g., body assembly 120) including at least one storage area (e.g., storage area 130), an adjustable assembly (e.g., adjustable assembly 125) that is movably attached to the body assembly, the adjustable assembly including a plurality of members (e.g., members 185, 190, and 195), and a jacking device (e.g., jacking device 180) disposed at least partially in the body assembly. The plurality of members may be movably attached to each other. At least one of the plurality of members may include a vehicle-attachable portion (e.g., portion 210). The plurality of members may include a first member having a first end portion that is movably attached to a first end portion of a second member, and a third member having a first end portion that is movably attached to a second end portion of the second member. A second end portion of the first member may be movably attached to the body assembly. The vehicle-attachable portion may be a second end portion of the third member. The adjustable assembly may be rotatably attached to the body assembly, and the plurality of members may be rotatably attached to each other. The body assembly may include at least one movable assembly that is movable relative to a main body of the body assembly, each of the at least one movable assembly including a storage area. The body assembly may include a plurality of members that are selectively extendable from a bottom portion of the body assembly. Each of the plurality of members may include a wheel or a caster. The jacking device may be disposed at least partially in the bottom portion of the body assembly. The jacking device may be selected from the group consisting of a scissor jack, a floor jack, a bottle jack, and a ratchet jack.

In at least some exemplary embodiments, an exemplary disclosed vehicle accessory may include a body assembly (e.g., body assembly 120) including at least one storage area (e.g., storage area 130), an adjustable assembly (e.g., adjustable assembly 125) that is movably attached to the body assembly, the adjustable assembly including a plurality of members, a jacking device (e.g., jacking device 180) disposed at least partially in the body assembly, and a vehicle-attachable attachment device (e.g., attachment device 115). The plurality of members may be movably attached to each other. At least one of the plurality of members may include an attachment portion (e.g., portion 210) that is removably attachable to the vehicle-attachable attachment device. The attachment portion may include an aperture that is aligned with an aperture of the vehicle-attachable attachment device when the attachment portion is removably attached to the vehicle-attachable attachment device. The exemplary disclosed vehicle accessory may further include a member that is removably insertable through the aperture of the attachment portion and the aperture of the vehicle-attachable attachment device when the attachment portion is removably attached to the vehicle-attachable attachment device. The plurality of members may include a first member having an end portion that is rotatably attached to a first end portion of a second member, and a third member having an end portion that is rotatably attached to a second end portion of the second member.

The exemplary disclosed system, apparatus and method may be used in any suitable application for providing an accessory to a vehicle. For example, the exemplary disclosed system, apparatus and method may be used to provide an accessory such as a storage container, luggage carrier, equipment carrier, tool box, food container, fluid liquid and/or fluid gas storage container, and/or any other suitable accessory for a vehicle. For example, the exemplary disclosed system, apparatus and method may be used to provide an accessory to any desired vehicle such as a truck, car, waterborne vehicle such as a boat or jet ski, aircraft such as a fixed wing aircraft (e.g., airplane) or rotary wing aircraft (e.g., helicopter), snowmobile, unmanned vehicle such as a drone, and/or any other suitable vehicle. The exemplary disclosed system, apparatus and method may also provide a recreational accessory such as a swim board or platform, a grill, a recreational equipment holder (e.g., ski holder), and/or any other suitable accessory used for recreational activities (e.g., ski sports, water sports, camping, and/or team sports). The exemplary disclosed system, apparatus and method may be used to provide an accessory at any desired portion of a vehicle such as a trailer (e.g., trailer hitch), a vehicle top, a vehicle side, and/or any other desired attachment portion of a vehicle.

Figure 10:
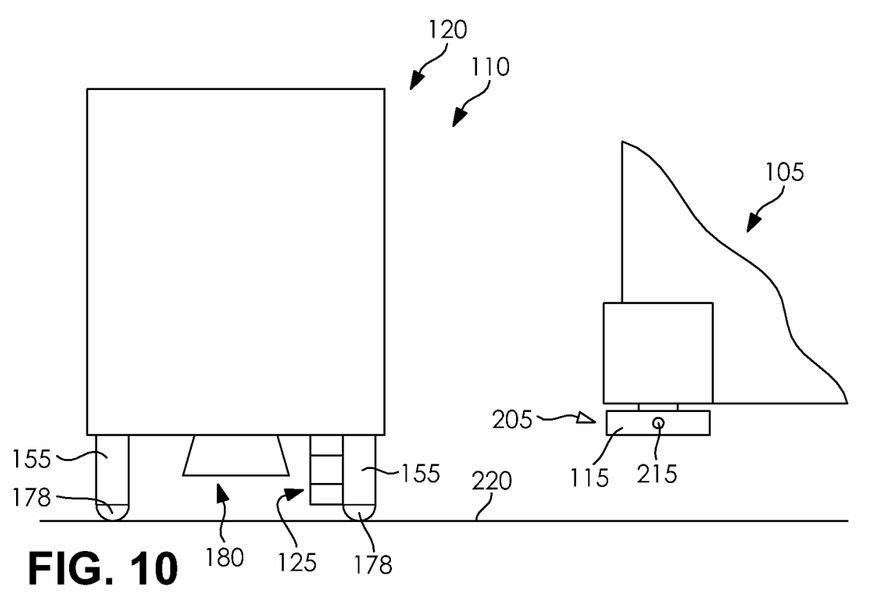
FIG. 10 is a side view of an exemplary system and apparatus, in accordance with at least some exemplary embodiments of the present disclosure.

An exemplary operation of the exemplary disclosed system, apparatus, and method will now be described. As illustrated in FIG. 10, attachment device 115 may be provided on vehicle 105. Assembly 110 including body assembly 120 and adjustable assembly 125 may also be provided. Members 155 may be lowered and locked in place via fasteners 175 so that assembly 110 may be moved easily across a surface (e.g., a surface 220 such as a ground surface) by a user. A user may thereby relatively easily push assembly 110 over surface 220 to a desired position relative to vehicle 105.

Figure 11:
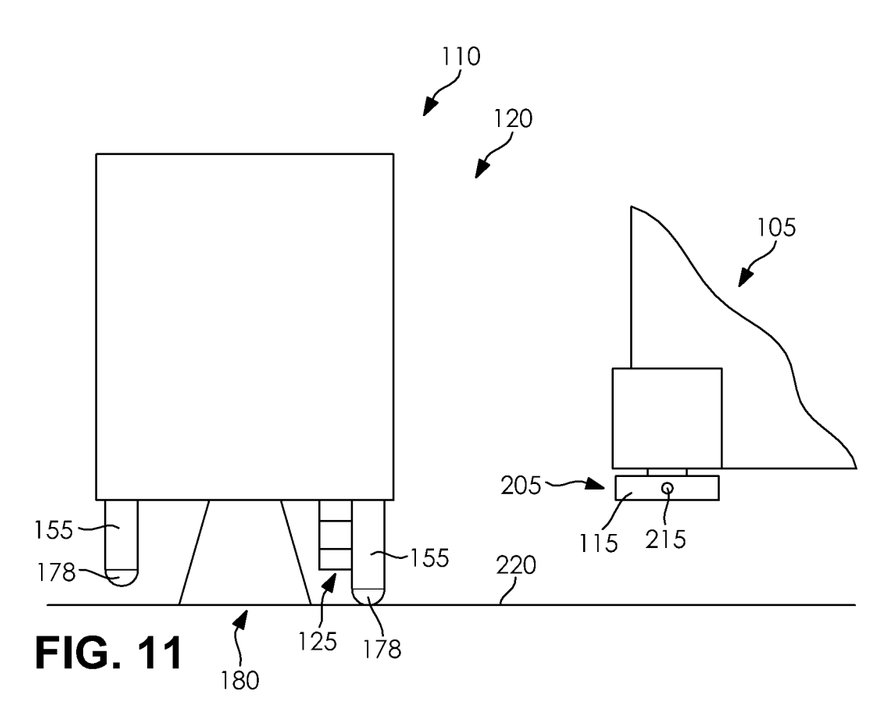
FIG. 11 is a side view of an exemplary system and apparatus, in accordance with at least some exemplary embodiments of the present disclosure.

As illustrated in FIG. 11, jacking device 180 may be activated to raise (e.g., or lower) body assembly 120 to a desired height relative to attachment device 115. For example, a user may control jacking device 180 to raise or lower body assembly 120 to an approximate height suitable for aligning adjustable assembly 125 with attachment device 115. Jacking device 180 may also be automatically controlled by a controller of system 100 to be raised to a predetermined height or a desired height based for example on sensors of system 100 (e.g., based on optical sensors, a leveling device, data transmitted to system 100, or any other suitable criteria). When assembly 110 is lifted and substantially supported by jacking device 180 on surface 220 (e.g., when jacking device 180 substantially supports a substantially full weight of assembly 110), members 155 may no longer be in contact with surface 220. Members 155 may for example be fully retracted if desired when jacking device 180 is supporting an entire weight of assembly 110 on surface 220.

Figure 12:
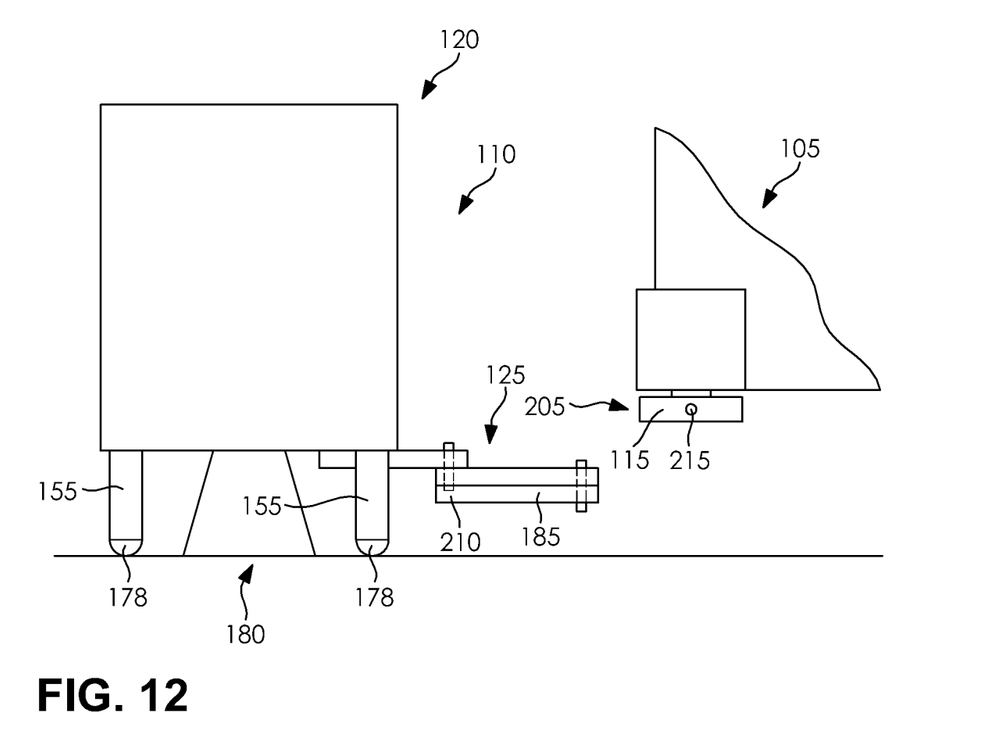
FIG. 12 is a side view of an exemplary system and apparatus, in accordance with at least some exemplary embodiments of the present disclosure.

As illustrated in FIG. 12, jacking device 180 may further adjust a height of assembly 110 if desired. For example, jacking device 180 may further adjust a height of assembly 110 so that portion 210 of member 185 is substantially aligned with a height of cavity or recess 205 of attachment device 115. A user may also move adjustable assembly 125 toward attachment device 115. As a user moves adjustable assembly 125 toward attachment device 115 and vehicle 105, jacking device 180 may further adjust a height of assembly 110 so that a height of portion 210 is substantially aligned (e.g., further aligned) with a height of cavity or recess 205. Because jacking device 180 may support an entire weight of assembly 110 while adjustable assembly 125 is moved by a user toward attachment device 115, a height of assembly 110 may be adjusted by jacking device 180 as adjustable assembly 125 is moved by a user. Alternatively for example, the user may lower members 155 to be close to surface 220, and may adjust jacking device 180 to lower assembly 110 so that assemblies 178 fully contact surface 220 and a substantially full weight of assembly 110 is supported by members 155. A user may switch or alternate between supporting assembly 110 by jacking device 180 and members 155 (e.g., or some or all of jacking device 180 and members 155) to move assembly 110 to a desired height (e.g., via an operation of jacking device contacting surface 220) and/or location (e.g., by moving assembly 110 based on assemblies 178 contacting surface 220) on surface 220.

Figure 13:
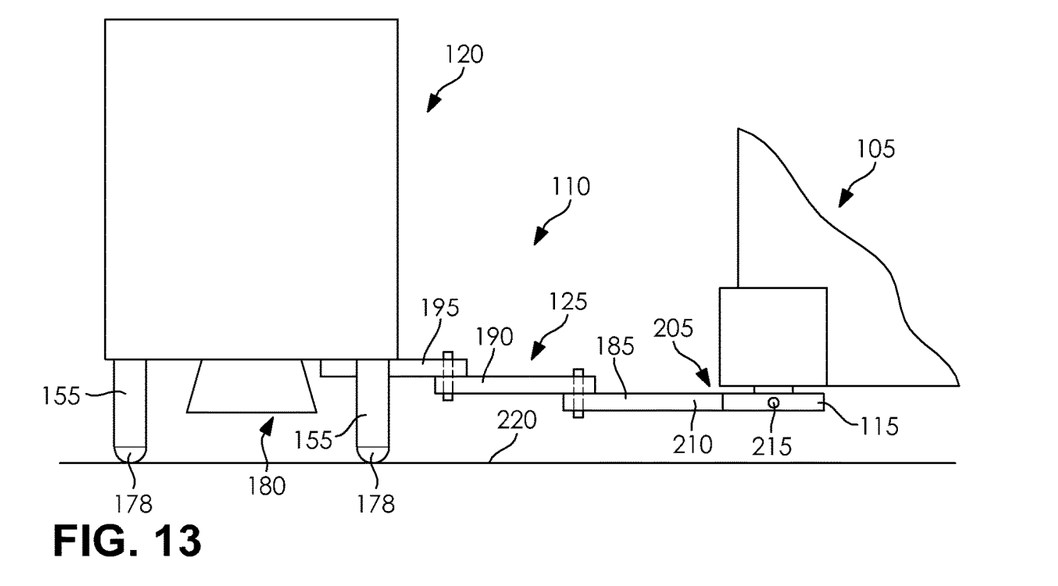
FIG. 13 is a side view of an exemplary system and apparatus, in accordance with at least some exemplary embodiments of the present disclosure.

As illustrated in FIG. 13, a height of portion 210 may be substantially the same as a height of cavity or recess 205 so that portion 210 is received in cavity or recess 205. It is contemplated that portion 210 may be any desired portion of assembly 110. Because adjustable assembly 125 may have some flexibility in adjusting a height of portion 210 by a user based on a structural cantilever action (e.g., flexible action) of adjustable assembly 125, the user may insert portion 210 into cavity or recess 205 when a height of portion 210 may not be substantially the same as a height of cavity or recess 205. Also as described above, jacking device 180 may be used to adjust a height of assembly 110 as desired. When supported on members 155 as described above, assembly 110 may be moved over surface 220 by the user toward vehicle 105 when assembly 110 is attached to vehicle 105 via attachment device 115. Member 215 may be inserted through apertures of portion 210 and attachment device 115 to lock portion 210 in place to attachment device 115 as described for example above. System 100 may also include a drive (e.g., a motorized drive) that may help a user move assembly 110 across surface 220.

Figure 14:
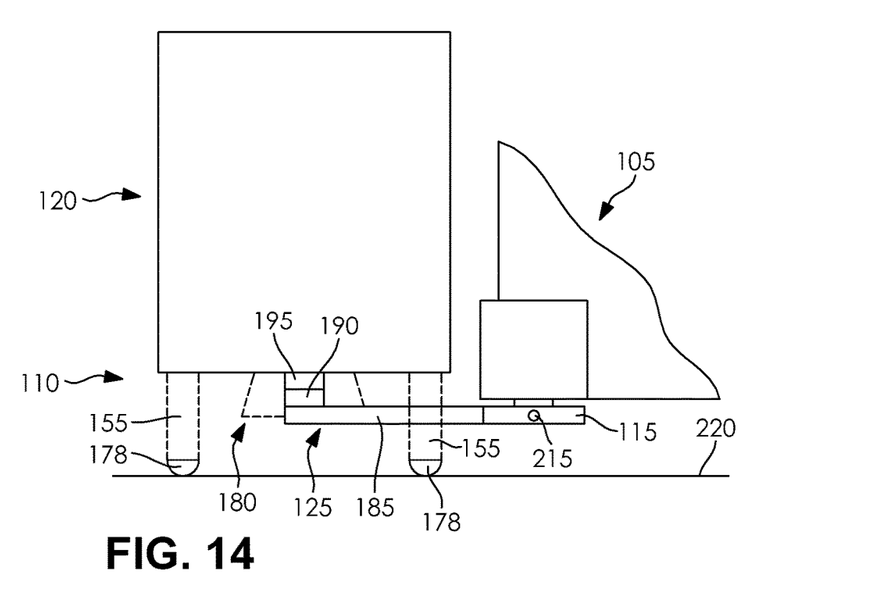
FIG. 14 is a side view of an exemplary system and apparatus, in accordance with at least some exemplary embodiments of the present disclosure.

As illustrated in FIG. 14, assembly 110 may be moved adjacent to vehicle 105 and attachment device 115 by a user or based on an automatic, motorized movement of assembly 110. For example, adjustable assembly 125 may be locked securely in place as illustrated in FIG. 14 to provide for suitable transportation. For example, the user may move assembly 110 to a position adjacent to attachment device 115, with assembly 110 being supported by members 155 and moving over surface 220 via assemblies 178 (e.g., wheel or casters moving over surface 220). At a position adjacent (e.g., or within a predetermined distance) to attachment device 115 when portion 210 is received in cavity or recess 205, members 155 (e.g., and/or jacking device 180) may be withdrawn into body assembly 120 and a substantially entire weight of assembly 110 may be supported by attachment device 115. It is also contemplated that a substantially entire weight of assembly 110 may be supported by attachment device 115 when body assembly 120 is pushed away from attachment device 115 via a movement of adjustable assembly 125.

In at least some exemplary embodiments, a weight of assembly 110 may be supported by one or more (e.g., a combination of) members 155, jacking device 180, and/or attachment device 115. A height (e.g., elevation) of body assembly 120 and adjustment assembly 125 may be adjusted by jacking device 180 when assembly 110 is partially or substantially entirely supported by jacking device 180.

In at least some exemplary embodiments, a user may move body assembly 120 to any desired position based on an operation of adjustable assembly 125. As described above, a weight of assembly 110 may be supported by one or more (e.g., a combination of) members 155, jacking device 180, and/or attachment device 115 as it is moved to a desired position by a user. As illustrated in FIGS. 1, 3, and 14, assembly 110 may be locked in a position adjacent to or near vehicle 105 for example during a movement of vehicle 105 (e.g., when vehicle 105 is operated). As illustrated in FIG. 4, a user may open body assembly 120 whenever desired to access contents, load, or unload objects and material to and from body assembly 120. For example as described above, a user may detach and attach assembly 110 to vehicle 105 via attachment device 115 as desired. The user may operate system 100 to configure body assembly 120 to be in any desired opened or closed state at any desired location relative to vehicle 105.

Figure 15:
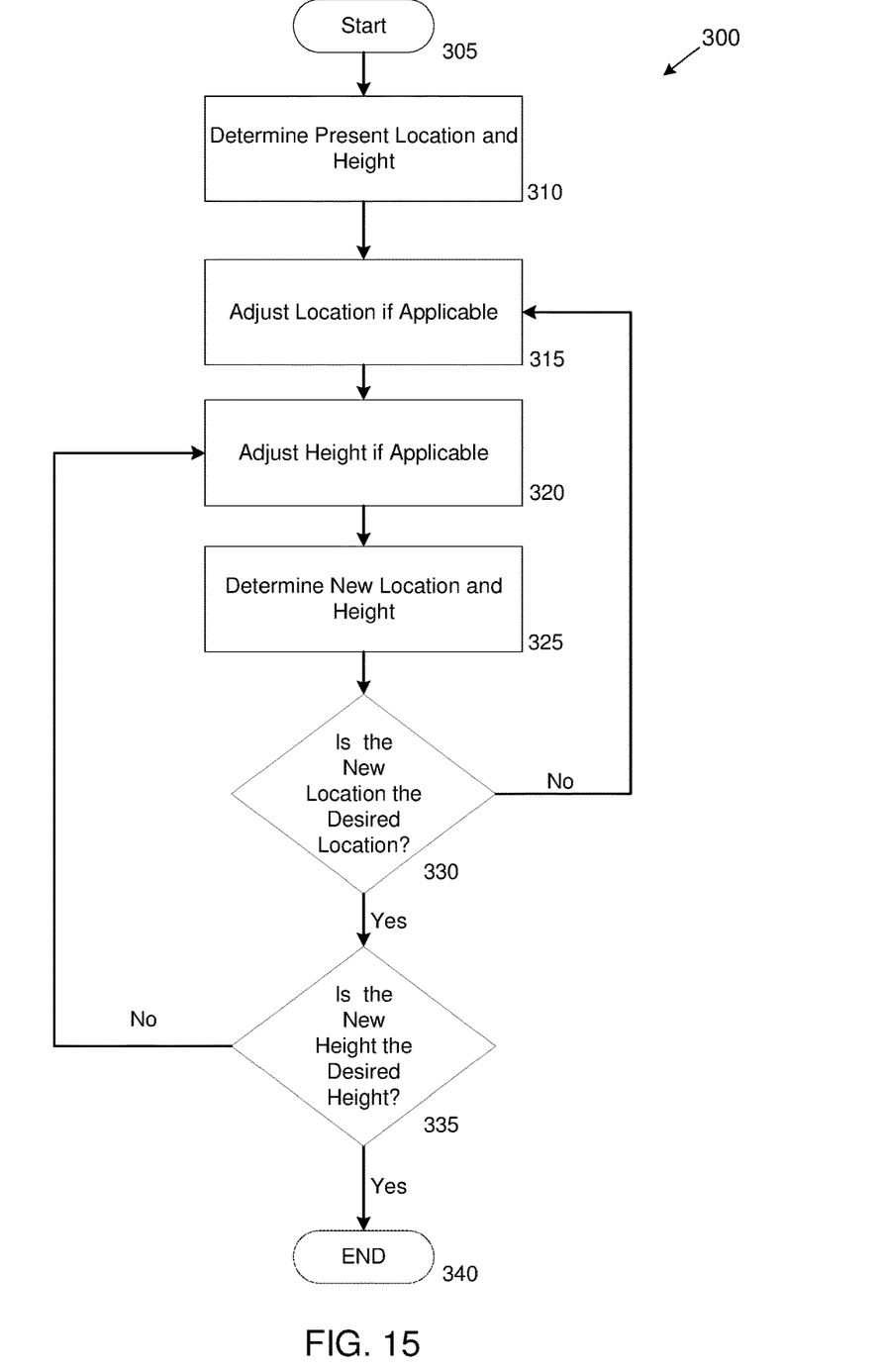
FIG. 15 illustrates an exemplary process of at least some exemplary embodiments of the present disclosure.

FIG. 15 illustrates an exemplary method 300. Method 300 starts at step 305. At step 310, a user determines a location and/or a height of body assembly 120 and adjustable assembly 125 (e.g., portion 210) relative to vehicle 105 (e.g., cavity or recess 205). The user may estimate the location and height based on visual observation. Also for example, the user may use a sensing device (e.g., laser leveler or other suitable sensing device for sensing a relative location or relative height between portion 210 and cavity or recess 205).

At step 315, the user may adjust a location of body assembly 120 and adjustable assembly 125 (e.g., portion 210) relative to vehicle 105 (e.g., cavity or recess 205) to an estimated desired position (e.g., position estimated to facilitate attachment of assembly 110 to vehicle 105 via attachment device 115). For example as described above, the user may move body assembly 120 over surface 220 via assemblies 178 as illustrated in FIG. 10. Also for example, the user may move adjustable assembly 125 as illustrated in FIGS. 5-7, 12 and 13 to an estimated desired position.

At step 320, the user may adjust a height of body assembly 120 and adjustable assembly 125 (e.g., portion 210) relative to vehicle 105 (e.g., cavity or recess 205) to an estimated desired height (e.g., position estimated to facilitate attachment of assembly 110 to vehicle 105 via attachment device 115). For example as described above and as illustrated in FIGS. 11 and 12, the user may use jacking device 180 to adjust a height of body assembly 120 and adjustable assembly 125 (e.g., portion 210) to an estimated desired height.

At step 325, the user (e.g., or system 100 automatically using a controller) may determine a new location and/or a new height similarly to step 310. At step 330, the user may determine whether or not the new location determined at step 325 is the desired location. If the new location is the desired location, the user (e.g., or system 100 automatically using a controller) may proceed to step 335. If the new location is not the desired location, the user (e.g., or system 100 automatically using a controller) may return to step 315.

At step 335, the user (e.g., or system 100 automatically using a controller) may determine whether or not the new height determined at step 325 is the desired height. If the new height is the desired height, the user (e.g., or system 100 automatically using a controller) may proceed to step 340, which ends method 300. If the new height is not the desired height, the user (e.g., or system 100 automatically using a controller) may return to step 320.

In at least some exemplary embodiments, the exemplary disclosed method may include providing an assembly (e.g., assembly 110) including a body assembly (e.g., body assembly 120) and an adjustable assembly (e.g., adjustable assembly 125) having an adjustable attachment portion (e.g., portion 210), storing material in the body assembly, selectively jacking the assembly configured in a first state up and down relative to a ground surface, selectively moving the assembly configured in a second state across the ground surface, and attaching the adjustable attachment portion to a vehicle attachment portion (e.g., attachment device 115) of a vehicle. A height of the adjustable attachment portion above the ground surface may be based on selectively jacking the assembly. The height of the adjustable attachment portion above the ground surface may be substantially equal to a height of the vehicle attachment portion above the ground surface. Selectively jacking the assembly configured in the first state may include contacting the ground surface with a jacking device that extends from a bottom portion of the body assembly. Selectively moving the assembly configured in the second state may include contacting the ground surface with a plurality of members that extend from a bottom portion of the body assembly. Each of the plurality of members may include a wheel or a caster. The exemplary disclosed method may further include selectively rotating a plurality of members of the adjustable assembly relative to each other, and selectively locking the plurality of members in place relative to each other. The vehicle may be a truck and the vehicle attachment portion may be a trailer hitch of the truck.

Several advantages may be associated with the exemplary disclosed system, apparatus, and method. For example, the exemplary disclosed system, apparatus and method may allow a user to quickly and easily attach, detach, and/or adjust an accessory on a vehicle. For example, the exemplary disclosed system, apparatus and method may allow a user to easily attach relatively heavy accessories to a vehicle without significant physical exertion. The exemplary disclosed system, apparatus and method may also allow a single user to attach, detach, and adjust relatively heavy accessories.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

What is claimed is:

1. An apparatus, comprising:

a body assembly comprising a first body subassembly, a second body subassembly and a third body subassembly, the first, second and third body subassemblies each including at least one storage area, wherein the second and third body subassemblies are each rotatably coupled to opposite ends of the first body subassembly and rotate in opposite directions through a rotational angle of 180 degrees along a first horizontal plane, wherein the second and third body subassemblies comprise a height measurement that is substantially equal to a height measurement of the first body subassembly, and wherein the second and third body subassemblies comprise a width measurement that is substantially one-half a width measurement of the first body subassembly;

an adjustable assembly that is movably attached to the body assembly, the adjustable assembly including a plurality of members; and a jacking device disposed at least partially in the body assembly;

wherein the plurality of members comprise a first member, a second member and a third member that are movably attached to each other, wherein the first member is rotatably coupled to the first body subassembly such that the first member rotates relative the first body subassembly through a rotational angle of at least 360 degrees parallel to the first horizontal plane, wherein the first member is rotatably coupled to the second member such that the first member rotates relative the second member through a rotational angle of at least 360 degrees parallel to the first horizontal plane, wherein the second member is rotatably coupled to the third member such that the second member rotates relative the third member through a rotational angle of at least 360 degrees parallel to the first horizontal plane, and wherein the first, second and third members are selectively locked and unlocked at respective rotational angles relative one another; and wherein the third member includes a vehicle-attachable portion disposed at an end opposite that of the second member coupling.

2. The apparatus of claim 1, wherein the body assembly includes a plurality of members that are selectively extendable from a bottom portion of the body assembly.

3. The apparatus of claim 2, wherein each of the plurality of members includes a wheel or a caster.

4. The apparatus of claim 2, wherein the jacking device is disposed at least partially in the bottom portion of the body assembly.

5. The apparatus of claim 1, wherein the jacking device is selected from the group consisting of a scissor jack, a floor jack, a bottle jack, and a ratchet jack.

6. A method, comprising:

providing an assembly including a body assembly comprising a first body subassembly, a second body subassembly and a third body subassembly, the first, second and third body subassemblies each including at least one storage area, wherein the second and third body subassemblies are each rotatably coupled to opposite ends of the first body subassembly and rotate in opposite directions through a rotational angle of 180 degrees along a first horizontal plane, wherein the second and third body subassemblies comprise a height measurement that is substantially equal to a height measurement of the first body subassembly, and wherein the second and third body subassemblies comprise a width measurement that is substantially one-half a width measurement of the first body subassembly, and the assembly further including an adjustable assembly having a plurality of members and an adjustable attachment portion, wherein the plurality of members comprise a first member, a second member and a third member that are movably attached to each other, wherein the first member is rotatably coupled to the first body subassembly such that the first member rotates relative the first body subassembly through a rotational angle of at least 360 degrees parallel to the first horizontal plane, wherein the first member is rotatably coupled to the second member such that the first member rotates relative the second member through a rotational angle of at least 360 degrees parallel to the first horizontal plane, wherein the second member is rotatably coupled to the third member such that the second member rotates relative the third member through a rotational angle of at least 360 degrees parallel to the first horizontal plane, and wherein the first, second and third members are selectively locked and unlocked at respective rotational angles relative one another;

storing material in the body assembly;

selectively jacking the assembly configured in a first state up and down relative to a ground surface;

selectively moving the assembly configured in a second state across the ground surface; and attaching the adjustable attachment portion to a vehicle attachment portion of a vehicle;

wherein a height of the adjustable attachment portion above the ground surface is based on selectively jacking the assembly; and wherein the height of the adjustable attachment portion above the ground surface is substantially equal to a height of the vehicle attachment portion above the ground surface.

7. The method of claim 6, wherein selectively jacking the assembly configured in the first state includes contacting the ground surface with a jacking device that extends from a bottom portion of the body assembly.

8. The method of claim 6, wherein selectively moving the assembly configured in the second state includes contacting the ground surface with a plurality of members that extend from a bottom portion of the body assembly.

9. The method of claim 8, wherein each of the plurality of members includes a wheel or a caster.

10. The method of claim 6, wherein the vehicle is a truck and the vehicle attachment portion is a trailer hitch of the truck.

11. A vehicle accessory, comprising:

a body assembly comprising a first body subassembly, a second body subassembly and a third body subassembly, the first, second and third body subassemblies each including at least one storage area, wherein the second and third body subassemblies are each rotatably coupled to opposite ends of the first body subassembly and rotate in opposite directions through a rotational angle of 180 degrees along a first horizontal plane, wherein the second and third body subassemblies comprise a height measurement that is substantially equal to a height measurement of the first body subassembly, and wherein the second and third body subassemblies comprise a width measurement that is substantially one-half a width measurement of the first body subassembly;

an adjustable assembly that is movably attached to the body assembly, the adjustable assembly including a plurality of members;

a jacking device disposed at least partially in the body assembly; and a vehicle-attachable attachment device;

wherein the plurality of members comprise a first member, a second member and a third member that are movably attached to each other, wherein the first member is rotatably coupled to the first body subassembly such that the first member rotates relative the first body subassembly through a rotational angle of at least 360 degrees parallel to the first horizontal plane, wherein the first member is rotatably coupled to the second member such that the first member rotates relative the second member through a rotational angle of at least 360 degrees parallel to the first horizontal plane, wherein the second member is rotatably coupled to the third member such that the second member rotates relative the third member through a rotational angle of at least 360 degrees parallel to the first horizontal plane, and wherein the first, second and third members are selectively locked and unlocked at respective rotational angles relative one another; and wherein the third member includes an attachment portion that is disposed at an end opposite that of the second member coupling and removably attachable to the vehicle-attachable attachment device.

12. The vehicle accessory of claim 11, wherein the attachment portion includes an aperture that is aligned with an aperture of the vehicle-attachable attachment device when the attachment portion is removably attached to the vehicle-attachable attachment device.

13. The vehicle accessory of claim 12, further comprising a member that is removably insertable through the aperture of the attachment portion and the aperture of the vehicle-attachable attachment device when the attachment portion is removably attached to the vehicle-attachable attachment device.

* * * * *